United States Patent

[11] 3,579,984

[72] Inventor Robert P. Rohde
Saginaw, Mich.
[21] Appl. No. 830,241
[22] Filed June 4, 1969
[45] Patented May 25, 1971
[73] Assignee General Motors Corporation
Detroit, Mich.

[54] FLUID POWER STEERING SYSTEM WITH FLUID PRESSURE RESERVE
2 Claims, 10 Drawing Figs.
[52] U.S. Cl. ................................................... 60/51, 60/52S
[51] Int. Cl. ..................................................... F15b 1/02, F15b 15/18
[50] Field of Search ........................................... 60/52.S, 51; 180/79.2; 91/375(A), 5, 137(Inquired)

[56] References Cited
UNITED STATES PATENTS
3,022,772   2/1962   Zeigler et al. .................. 91/375A
3,099,327   7/1963   McAdams ..................... 60/52S
3,458,998   8/1969   Bishop .......................... 60/51

Primary Examiner—Edgar W. Geoghegan
Attorneys—W. E. Finken, H. Furman and D. L. Ellis ABSTRACT: A reserve supply of fluid pressure is provided for a vehicle fluid power steering system including an accumulator kept charged to a predetermined minimum pressure and communicated to the fluid power steering gear in parallel with the normal or primary pump source of pressure fluid. The rotary control valve for the fluid power gear includes a primary set of open center configuration lands and grooves operable over a normal steering travel range in the valve to selectively pressurize either side of the fluid motor, and a further set of closed center configuration lands and grooves communicated to the accumulator fluid pressure but normally blocking communication between the accumulator and the fluid motor until normal steering travel is exceeded in either direction of actuation, as during failure of the primary pump.

INVENTOR.
Robert P. Rohde
BY
D.L. Ellis
ATTORNEY

INVENTOR.
Robert P. Rohde
BY
D. L. Ellis
ATTORNEY

FLUID POWER STEERING SYSTEM WITH FLUID PRESSURE RESERVE

The primary object of this invention is to provide an improved automotive vehicle fluid power steering system including a reserve source of fluid pressure operable in the event of failure of the primary fluid pressure source.

Another object of this invention is to provide such a fluid power steering system wherein the fluid pressure reserve is instantaneously available but wherein notification of the failure of the primary fluid pressure source is first given the vehicle operator through a change in the steering characteristics of the power steering system.

A further object of this invention is to provide a fluid pressure power steering system including a steering gear, a pump or other primary source of fluid pressure, an accumulator source of secondary fluid pressure operable in the event of failure of the pump, and a control valve means in the power steering gear including valve members relatively movable over a normal travel range when supplied from the primary source of fluid pressure to steer the vehicle but which, in the event of pump failure, are movable an extra degree in either direction beyond the normal travel range to communicate the accumulator supply of secondary pressure fluid to the steering gear for emergency or reserve operation thereof.

In accordance with the invention, a fluid power steering gear system of the type including a power steering gear, a pump, and a control valve within the gear normally selectively communicating the pressurized fluid from the pump to either end chamber of the fluid motor, has added thereto an accumulator source of secondary or reserve fluid pressure maintained at a predetermined minimum of fluid pressure by selective communication to the pressurized fluid delivered by the pump.

In contrast with past systems, the constant supply in the accumulator secondary source is connected or communicated with the control valve of the power steering gear in parallel with the primary or pump supply, and the control valve portion of the power steering gear includes an open center configuration of lands and grooves or like port controlling structure operative during a normal range of valve movement in either actuating direction to communicate primary pressure fluid delivered from the pump to either end chamber of the power steering gear for steering the vehicle. The accumulator pressure fluid supply is concurrently supplied to the control valve but through an additional configuration of lands and grooves in the control valve members held in closed center condition during the normal range of valve travel. In the event of failure of the primary fluid pressure source, further travel is required in the control valve to open communication between the accumulator secondary source and the steering gear to further pressurize the respective end chamber of the motor being selected. Conventional resilient centering means such as a torsion rod between the movable valve members is employed and is operable during the extra valve travel experienced when using the secondary source. Thus, the vehicle operator is apprised of the failure of the primary pressure source by the added effort required to manipulate the power steering gear and dirigible wheels of the vehicle.

The stated and other objects, features and advantages of the invention will be readily apparent from the following specification and from the drawings wherein.

Figure 1:
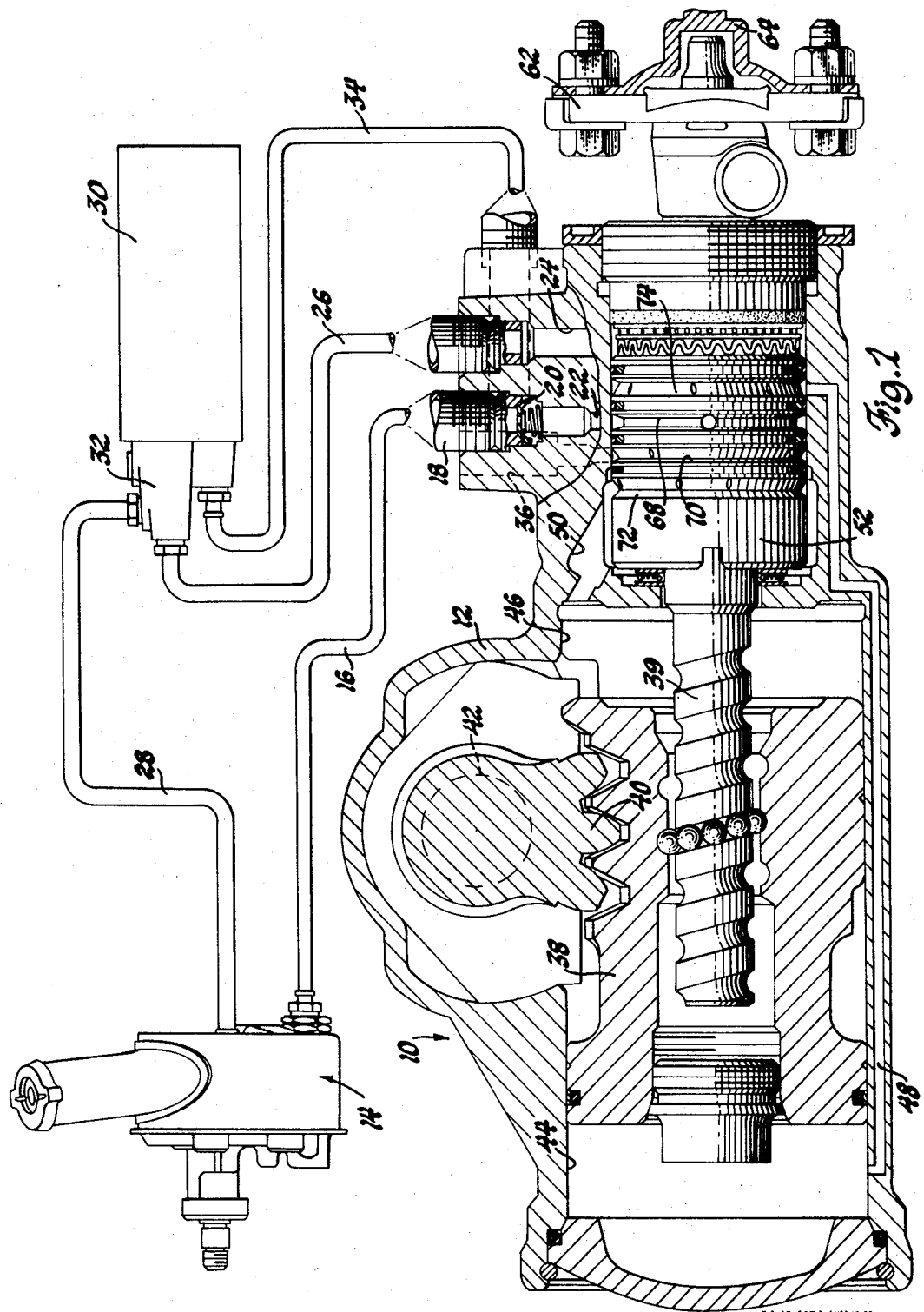
FIG. 1 is a partially schematic partially section view of a power steering system with fluid pressure reserve according to the invention.

Referring now particularly to FIG. 1 of the drawings, an automotive vehicle fluid power steering system according to the invention includes a steering gear 10 of the integral inline type including coaxial servomotor and control valve portions in a common housing 12. Reference may be had to Zeigler et al. U.S. Pat. No. 3,022,772 issued Feb. 27, 1962 for a complete description of the general aspects of such a steering gear unit. The primary source of fluid pressure for supply of steering gear 10 is the engine driven pump with integral reservoir, indicated generally at 14, and well known in the art. Pressure fluid flow delivered by the pump is carried by a conduit 16 to a coupling 18 including a one-way check valve 20 leading to a primary pressure inlet 22 in the housing 12 opening to a central bore thereof. Check valve 20 operates to allow fluid passage through inlet 22 only from pump 14. Fluid flow returns from steering gear 10 through and exhaust passage 24 in the housing 12 and from a similar coupling through conduits 26 and 28 to the reservoir portion of pump unit 14. Intervening in the conduits 26 and 28 is connection to an accumulator charging valve 32 supplying and holding at a predetermined pressure a volume of fluid contained within an accumulator tank 30. The details of the accumulator as well as those of the charging valve 32 may accord generally with those of the well-known prior devices which contemplate maintenance of a predetermined minimum level of pressure within the volume of fluid in accumulator 30 by a pressure-responsive shifting in the accumulator charging valve 32 to supply fluid delivered by pump unit 14, as through conduit 26, to the accumulator tank. Particular reference may be had to copending application Ser. No. 834,763, filed June 19, 1969, Lee M. Brewer for a preferred construction of charging valve. The constant supply of pressure fluid thus maintained in the accumulator tank 30 is fed through a conduit 34 suitably coupled to a longitudinal passage in the housing 12 of steering gear 10 in turn connecting with a radially drilled secondary pressure inlet 36, all indicated in broken lines.

The steering gear unit 10 includes in its servomotor and reduction gear portion of a combined ball nut and power piston 38 engaged with a screw shaft 39 and connected through suitable gear tooth structure 40 to the output or pitman shaft 42, which is connected to the vehicle steering linkage. Ball nut-piston 38 delineates opposite motor end chambers 44 and 46 each supplied with working pressure fluid by respective supply passages 48 and 50 from the control valve portion of the steering gear.

Figure 2:
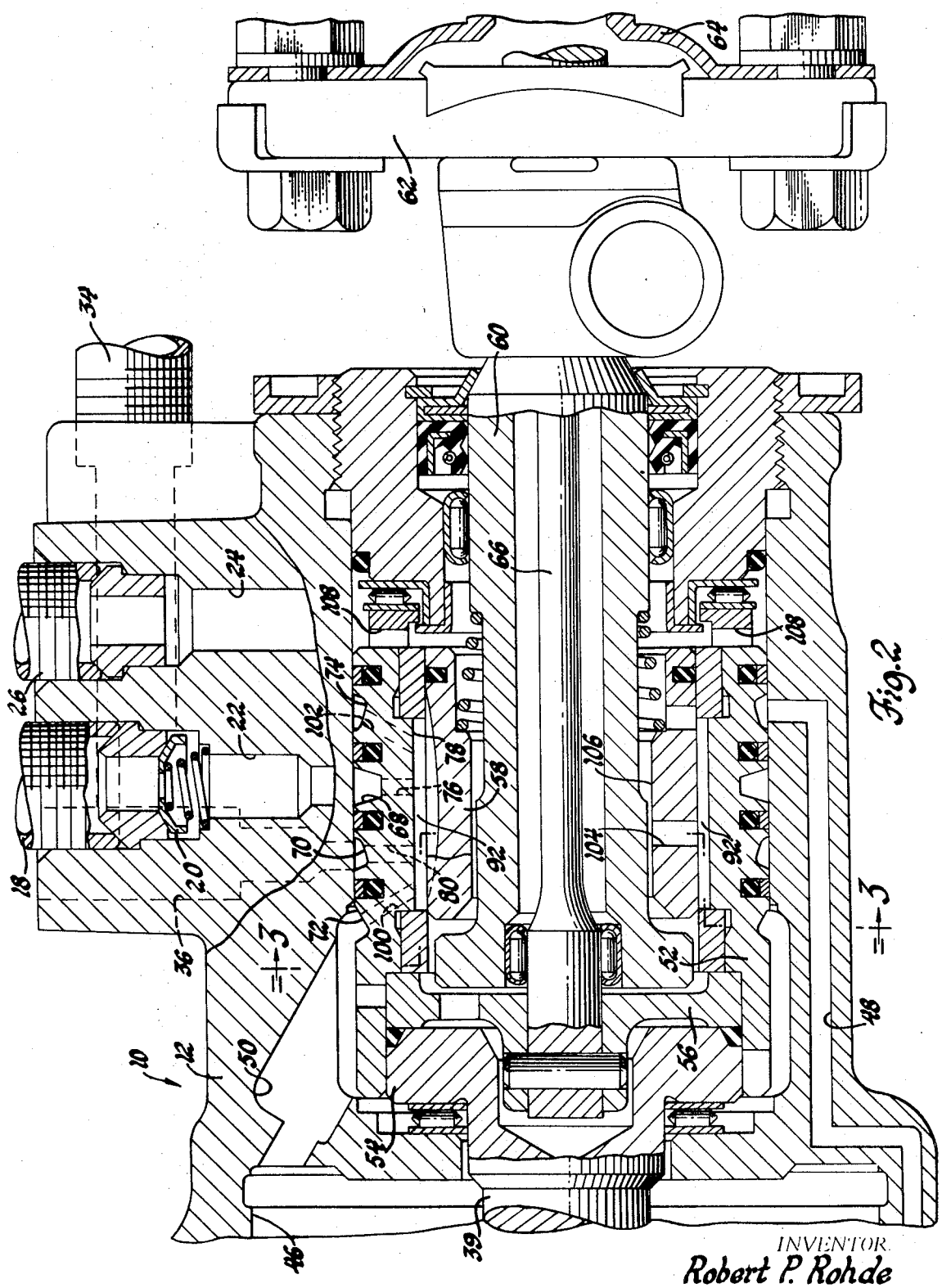
FIG. 2 is an enlarged partially broken away view of a port on FIG. 1.

Referring to FIG. 2, the control valve basically includes two relatively rotatable valve elements, the first or valve sleeve 52 being rotatably mounted within the central bore of housing 12 and connected with the enlarged end 54 of the screw shaft 37 of the reduction gear through a connector 56. The other or spool valve element 58 is rotatably mounted within sleeve 52 and is suitably connected for unitary rotation as by pin and slot connection or the like, not shown, with the inner end of an input stub shaft 60. The stub shaft connects through a suitable flexible coupling indicated generally at 62 to a steering shaft 64 carrying at its upper end on the steering column within the vehicle passenger compartment the usual steering wheel. As explained in more detail in the Zeigler et al. patent, stub shaft 60 with its unitary valve spool 58 is permitted limited lost motion on the order of a few degrees relative to the valve sleeve 52 and screw shaft 39 by an abutment conformation, not shown, which after the limited lost motion is taken up, establishes direct driving connection through the control valve between steering shaft 64 and the screw shaft 39. In accordance with the invention, the limited lost motion available in either direction in the control valve from a neutral relation between the sleeve 52 and the spool 58 is utilized for valve actuation for power steering over a prescribed range of rotation between the elements in either direction to selectively pressurize one or the other end chambers 44 and 46 by the pump unit 14, as well as actuation of the power steering gear by the reserve source of pressure fluid from accumulator 30, in the event of failure of pump unit 14, upon selected relative rotation of the valve elements past the normal valve travel range.

As also explained in more detail in the Zeigler et al. patent, stub shaft 60 and the screw shaft end 54 are interconnected by a resilient centering agency in the form of a torsion rod 66 operative to resiliently center the valve parts in neutral relation and to provide predetermined linear rate of resistance to relative rotation between the sleeve and spool elements in either direction from such neutral relation over not only the normal travel range but the secondary pressure actuation range as well.

Figure 3:
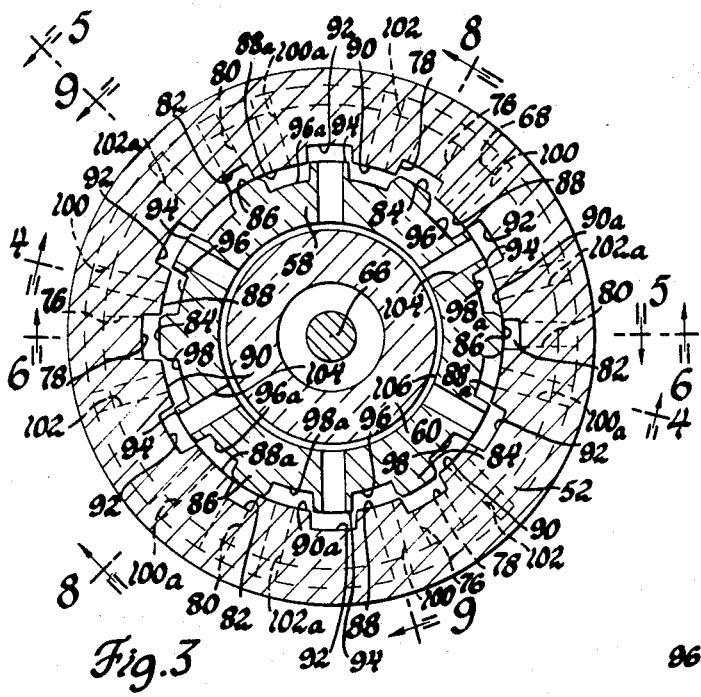
FIG. 3 is a sectional view taken generally along the plane indicated by the lines 3-3 of FIG. 2.
Figure 6:
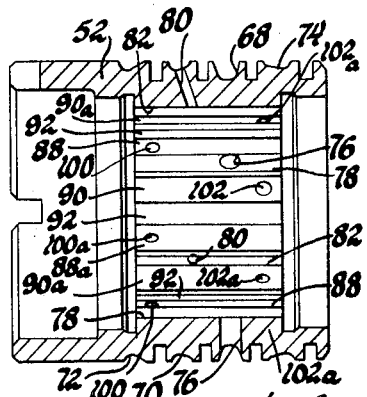
FIG. 6 is a sectional view taken generally along he plane indicated by the lines 6-6 of FIG. 3.

Referring more specifically in FIG. 2 to the fluid pressure distribution provided by the valve spool 58 and the valve sleeve 52, the latter is provided with an annular groove 68 communicating with the primary pressure inlet 22 from pump unit 14. A further annular groove 70 communicates with the secondary pressure inlet 36, and annular grooves 72 and 74 communicate respectively with the motor end chamber passages 50 and 48. Referring to FIG. 3, the annular groove 68 is intercepted by a plurality of radial bores 76 opening to a like number of axially extending pressure grooves 78 on the internal periphery of the sleeve, see also FIG. 6. Likewise, accumulator supply annular groove 70 communicates via radial bores 80 to a like set of axial grooves 82. Registered with the primary pressure grooves 78 are lands 84 on the spool 58 to form primary pressure ports, and lands 86 on the spool register with the secondary accumulator grooves 82 cooperable for secondary pressure ports. Flanking each axial groove 78 are lands 88 and 90 on the sleeve, and adjacent each of these are axial return grooves 92. Lands 94 on spool 58 register will grooves 92 to form return ports, and axially extending grooves 96 and 98 on the spool either side of lands 84 register with the lands 88 and 90 of the sleeve to form primary motor ports. Likewise, either side of spool land 86, grooves 96a and 98a cooperate with lands 88a and 90a on the sleeve to provide motor ports for the accumulator supply as will be seen.

Figure 4:
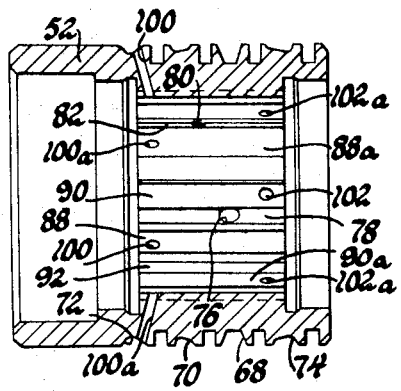
FIG. 4 is a sectional view taken generally along the plane indicated by the lines 4-4 of FIG. 3.
Figure 5:
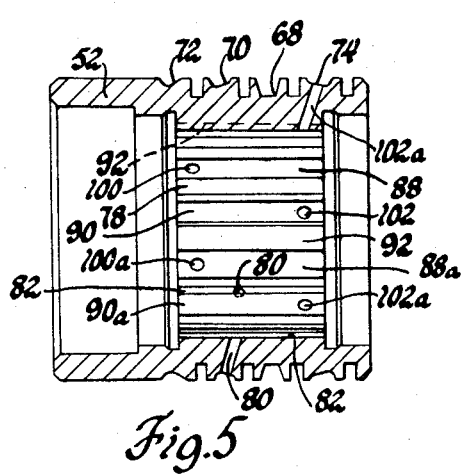
FIG. 5 is a sectional view taken generally along the plane indicated by the lines 5-5 of FIG. 3.

As shown in broken lines in FIGS. 2 and 3, and more clearly in FIG. 4, the primary motor passages at lands 88 and grooves 96 communicate via a radial bore in sleeve 52 to the annular groove 72 on the exterior thereof, thence through passage 50 to the one end chamber 46 on the servomotor unit. Likewise, the motor passages defined at lands 90 and grooves 98 communicate via radial bores 102 to the annular groove 74 of the sleeve, thence through the passage 48 to the end chamber 44 of the motor. The return passages defined at grooves 92 in the sleeve and registered lands 94 on the spool communicate via radial bores 104 in the sleeve to the central bore 106 thereof, recirculation of pressure fluid in the control valve being had through this central bore and a radial passage 108 in the sleeve, FIG. 2, to communication with the exhaust passage 24.

Referring to FIG. 3, the valve parts are shown in a neutral relation with no steering input on stub shaft 64 and with torsion rod 66 relaxed. In such condition, the valve parts permit so-called open center or recirculating flow from the pump unit 14 through the control valve the back to the reservoir portion thereof through conduits 26 and 28, and experiencing only the normal static pressure encountered within the system. This is of course accomplished by suitable sizing of the various primary pressure and return lands 84 and 94 on the spool to have a lesser effective circumferential width than the corresponding registered grooves 78 and 92 in the sleeve. In one preferred embodiment, each spool land 84 has at each side thereof a gap of approximately 0.028 inches from the adjacent sleeve edge at the groove 78, while each return land 94 of the spool is underlapped or formed to have a gap at each side on the order of about 0.011 inches from the adjacent sleeve edges at groove 92.

Figure 7:
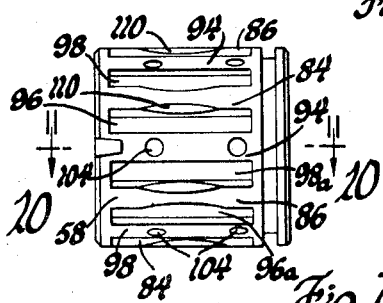
FIG. 7 is an elevational view of the valve spool.
Figure 8:
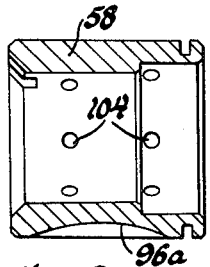
FIG. 8 is a view taken generally along the plane indicated by the lines 8-8 of FIG. 3.
Figure 9:
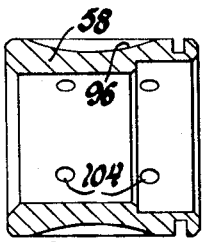
FIG. 9 is a sectional view taken generally along the plane indicated by the lines 9-9 of FIG. 3.
Figure 10:
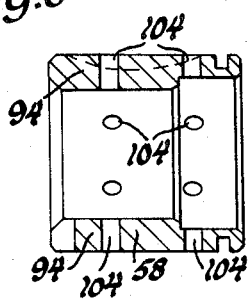
FIG. 10 is a sectional view taken generally along the plane indicated by the lines 10-10 of FIG. 7.

Further, as seen more clearly in FIG. 7, the primary pressure lands 84 are chamfered as at 110 to provide a gradual application of pressure buildup during and after initial rotation of the valve spool 58 relative to the sleeve in either direction on the order of about 2° bringing either edge of the land 84 in line to line relationship with the adjacent sleeve edge at groove 78. Under slight additional rotation of a fraction of a degree, an totaling less than 3° of relative rotation, the primary pressure ports at groove 78 will be completely closed, the return ports at grooves 92 also having been completely closed at one side thereof to accomplish full pressure buildup in the steering system.

Taking as a specific example a powered left turn arising from relative rotation of stub shaft 64 and spool 58 in a clockwise direction as viewed in FIG. 3 relative to the valve sleeve, the lands 84 are moved to a maximum of a little over 2° to fully close communication between the pump unit 14 and the primary pressure bores 76 in the sleeve and the motor port grooves 96, while at the same time opening full communication between such primary pressure bores and the other motor passages at lands 90 serving radial bores 102 leading to the motor passage 48. Accordingly, pressure buildup is had at the motor end chamber 44 to accomplish the powered left turn actuation of the pitman shaft 42, while simultaneously the motor end chamber 46 is permitted exhaust through the passage 50, annular groove 72, radial bores 100 and motor port grooves 96 thence through the radial ports 104, central bore 106 and the exhaust passage 108. A powered right turn by pressure from pump unit 14 under opposite or counterclockwise displacement of spool 58 is believe obvious from the foregoing.

Referring further to the land and groove structure shown in FIG. 3, the lands 86 on the spool 58 are purposely constructed with an effective circumferential width substantially larger than the width of the corresponding axial grooves 82 in the sleeve, thereby to provide a closed center configuration which is maintained through the normal range of travel of the open center primary mode of the steering valve parts from neutral up through slightly greater than the 2° relative rotation. Specifically, lands 86 are constructed will an overlap relative to each sleeve edge at groove 82 of about 0.035 inches requiring slightly greater than 3° of relative rotation in either direction to align one edge of the land with corresponding edge of the groove 82 whereafter communication is had between the annular accumulator supply groove 70 through the interior of the valve to the selected end of the gear. As seen more clearly in FIG. 7, each secondary pressure land 86 is slightly chamfered so that the beginning of a gradual pressure buildup can be realized at the arrival of the 3° of relative rotation.

Continuing now the operational example of a left turn through supply of pressure fluid to motor end chamber 44, and assuming that a failure of pump unit 14 occurs so that no pressurized fluid is supplied to primary pressure groove 68, the invention contemplates that the operator need only exert additional effort on the steering shaft 64 and torsion rod 66 for continued relative rotation between the valve parts beyond the normal range thereof within which the primary pressure and return lands function. The vehicle operator may or may not, of course, be immediately advised of the failure of pump unit 14 depending upon the driving conditions existing at the time of the failure. However, in all cases the operator will be advised of such pump failure through the "feel" experienced at the steering wheel requiring the extra rotation in the stub shaft 16 and the further resilient twisting of torsion rod 66 to accomplish the extra relative rotation in the valve. Thus, while it is seen that the accumulator and second ports at lands 86 and grooves 82 are normally blocked from communication to operate the servomotor end chambers 44 or 46 during the normal travel range of slightly greater than 2°, additional rotation on the valve parts to at least 3° will, in the left turn, open the right-hand edges of the lands 86 for communication of accumulator pressure fluid through the radial bores 80 into the passage defined at the axial grooves 98a in spool 58, and thence through bores 102a in the sleeve to the annular grooves 74 and the motor end chamber 44 actuation of the servomotor. The return passages in the axial grooves 92 adjacent grooves 98a are of course closed against leakage of the accumulator pressure fluid to return, and again it is seen that simultaneous exhaust of the other end chamber 46 of the motor is permitted by continued communication, as obtains in the primary open center mode of left turn, through the radial bores 100, as well as 100a, and the axial grooves 96 and 96a which lead to the exhaust passages 108. Again, from the foregoing, the pressure fluid distribution from accumulator 30 occurring in a powered right turn is believed obvious.

As stated hereinabove, the control valve includes conventional provisions for direct drive connection between the steering shaft 64 and screw 39. In the case of the present invention, the lost motion available in the valve parts in either direction from neutral prior to such connection includes an additional 2° or so of final valve travel for the accumulator service of the power steering gear.

Having thus described the invention, what is claimed is:

I claim:

1. In a vehicle power steering system, a double-acting fluid motor, a primary source of pressure fluid, a secondary source of pressure fluid, a reservoir, and a control valve including a pair of relatively movable valve members, one of said valve members having alternate lands and grooves and the other of said valve members having complementary alternate grooves and lands juxtaposed to said first mentioned land and grooves and defining therewith an open center pressure port communicated with said primary source, a pair of motor ports flanking said pressure port and each communicated with a respective end chamber of said fluid motor, and a return port adjacent each said motor port and communicated with said reservoir, said valve members being relatively movable in opposite directions from an open center neutral relation and over a normal steering valve travel range for selective pressurization of one of said motor end chambers to varying degrees, said valve members having further juxtaposed lands and grooves defining adjacent each said return port a further motor port communicated to a respective one of the motor end chambers and secondary pressure ports communicated with said secondary source of pressure fluid, and further juxtaposed lands and grooves of said valve members cooperating to block communication between said secondary pressure source and said further motor ports during said movement of said valve members in either direction over said normal travel range thereof, further relative movement of said valve members in either direction beyond said normal travel range thereof connecting one of said secondary pressure ports with a further motor port respective to the selected direction of movement to communicate said secondary pressure source with said motor whereby in the absence of pressure fluid from said primary source said secondary pressure source serves to selectively operate said motor.

2. In a vehicle power steering system, a double-acting fluid motor, a pump providing a primary source of pressure fluid, an accumulator source of secondary pressure fluid, a reservoir, means connection said pump and said accumulator for maintaining the latter at a predetermined level of fluid pressure, and a control valve including a pair of relatively rotatable valve members, one of said valve members having angularly spaced alternate lands and grooves and the other of said valve members having complementary angularly spaced alternate grooves and lands juxtaposed to said first mentioned land and grooves and defining therewith an open center pressure port communicated with said pump, a pair of motor ports flanking said pressure port and each communicated with a respective end chamber of said fluid motor, and a return port adjacent each said motor port and communicated with said reservoir, said valve members being relatively angularly movable in opposite directions from an open center neutral relation and over a normal steering valve travel range for selective pressurization of one of said motor end chambers to varying degrees, said one valve member having further angularly spaced alternate lands and grooves and said other valve member having further angularly spaced alternate grooves and lands juxtaposed to the further lands and grooves of said one member and defining adjacent each said return port a further motor port each communicated to a respective one of the motor end chambers and secondary pressure ports communicated with said accumulator, said further juxtaposed lands and grooves of said valve members cooperating to block communication between said accumulator an said further motor ports during said angular movement of said valve members in either direction over said normal travel range thereof, further relative angular movement of said valve members in either direction beyond said normal travel range thereof connecting one of said secondary pressure ports with a further motor port respective to the selected direction of movement to communicate said accumulator with said motor whereby in the absence of pressure fluid from said pump said accumulator serves to selectively operate said motor.